(12) United States Patent
Chen et al.

(10) Patent No.: US 11,002,952 B2
(45) Date of Patent: May 11, 2021

(54) PROJECTOR AND WAVELENGTH CONVERSION DEVICE

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 173 days.

(21) Appl. No.: 16/164,670

(22) Filed: Oct. 18, 2018

(65) Prior Publication Data

US 2019/0121119 A1 Apr. 25, 2019

(30) Foreign Application Priority Data

Oct. 24, 2017 (CN) .......................... 201710997421.X

(51) Int. Cl.
*G02B 3/00* (2006.01)
*G02B 26/08* (2006.01)
(Continued)

(52) U.S. Cl.
CPC ........... *G02B 26/008* (2013.01); *G02F 2/004* (2013.01); *G03B 11/00* (2013.01); *G03B 21/204* (2013.01);
(Continued)

(58) Field of Classification Search
CPC .......... G02B 13/00; G02B 3/00; G02B 26/10; G02B 26/105; G02B 26/0841; G02B 26/001; G02B 7/006; G02B 5/223; G02B 26/007; G02B 26/008; F21W 2131/406; F21S 10/02; H04N 9/3197; F21Y 2101/02

USPC ................ 359/722–723, 885, 889–892, 887, 359/196.1–199.1, 223.1, 225.1, 226.1; 362/84, 293; 353/84
See application file for complete search history.

(56) References Cited

U.S. PATENT DOCUMENTS

2008/0049346 A1 2/2008 Cusick et al.
2014/0204558 A1 7/2014 Bartlett
(Continued)

FOREIGN PATENT DOCUMENTS

CN 203489181 U 3/2014
CN 204420882 U 6/2015
(Continued)

*Primary Examiner* — Dawayne Pinkney

(57) ABSTRACT

A projector and a wavelength conversion device thereof are provided. The projector includes an illumination system that includes a light source device and a wavelength conversion device. The light source device is configured to provide an excitation beam. The wavelength conversion device is disposed on a transmission path of the excitation beam, and configured to convert the excitation beam into an illumination beam. The wavelength conversion device includes a substrate comprising a first surface, a second surface, and an axis center, a heat-conducting connection structure, a first reflective structure, and a wavelength conversion structure. The heat-conducting connection structure is located between the first surface and a first reflective structure, the first reflective structure is located between the heat-conducting connection structure and a wavelength conversion structure, and the wavelength conversion structure is located on the first reflective structure.

18 Claims, 9 Drawing Sheets

(51) Int. Cl.
*G02B 5/22* (2006.01)
*G03B 21/14* (2006.01)
*G02B 26/00* (2006.01)
*G02F 2/00* (2006.01)
*G03B 21/20* (2006.01)
*H04N 9/31* (2006.01)
*G03B 11/00* (2021.01)

(52) U.S. Cl.
CPC ......... *H04N 9/3114* (2013.01); *H04N 9/3144* (2013.01); *H04N 9/3161* (2013.01)

(56) References Cited

U.S. PATENT DOCUMENTS

| | | | |
|---|---|---|---|
| 2015/0185596 A1* | 7/2015 | Hsieh | G03B 21/142 |
| | | | 353/84 |
| 2016/0091782 A1* | 3/2016 | Hashizume | G03B 21/204 |
| | | | 353/84 |
| 2016/0147136 A1* | 5/2016 | Nojima | G03B 21/204 |
| | | | 353/98 |
| 2016/0252722 A1* | 9/2016 | Li | F21V 13/08 |
| | | | 362/84 |
| 2017/0092786 A1 | 3/2017 | Newell et al. | |
| 2017/0160627 A1* | 6/2017 | Ikesue | G03B 21/16 |

FOREIGN PATENT DOCUMENTS

| | | |
|---|---|---|
| CN | 105045022 A | 11/2015 |
| CN | 204879969 U | 12/2015 |
| CN | 106287580 A | 1/2017 |
| CN | 106681092 A | 5/2017 |
| CN | 106896631 A | 6/2017 |
| CN | 107209302 A | 9/2017 |
| JP | 2015138136 A | 7/2015 |
| JP | 2015197620 A | 11/2015 |
| TW | 585255 U | 4/2004 |
| TW | 200831658 A | 8/2008 |
| TW | 201621452 A | 6/2016 |
| TW | M549365 U | 9/2017 |
| WO | 2016056285 A1 | 4/2016 |

* cited by examiner

PROJECTOR AND WAVELENGTH CONVERSION DEVICE

CROSS-REFERENCE TO RELATED APPLICATION

THIS APPLICATION CLAIMS THE PRIORITY BENEFIT OF CHINA APPLICATION (CN201710997421.X FILED ON 2017 Oct. 24). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a wavelength conversion device, and more particularly to a wavelength conversion device for a projector.

BACKGROUND OF THE INVENTION

The structure of a current projector generally includes an excitation system, a light valve and a projection lens. An illumination system provides an illumination beam, the light valve is used to convert the illumination beam into an image beam, and the projection lens is used to project the image beam to a screen to form an image screen on the screen. The phosphor of a phosphor wheel will be excited after being irradiated by an excitation beam provided by an excitation light source. The phosphor is formed by coating fluorescent glue on a substrate.

Currently, the fluorescent glue is mainly composed by mixing phosphor powders and an adhesive. However, with the thermal conductivity of the fluorescent glue less than 1 W/mK, a decay in brightness may occur as the temperature of the phosphor ramps up above 150° C. during the excitation process of the phosphor caused by the excitation beam, and the decay in brightness may become more significant as the temperature increases. Additionally or alternatively, when the temperature of the phosphor ramps up above 200° C., a plummet in brightness may be caused due to broken or failed fluorescent glue. Therefore, how to solve these problems is indeed a focus of attention for those related in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projector, having a wavelength conversion device that may rapidly conduct thermal energy, which may be used to solve the problem of brightness decay caused from high temperature.

The invention provides a wavelength conversion device, which can conduct thermal energy rapidly, which may be used to solve the problem of brightness decay caused from high temperature.

Other objects and advantages of the invention may be further appreciated from the technical features broadly embodied and described as follows.

In order to achieve at least one of the objects or other objects, an embodiment of the invention provides a projector, comprising an illumination system, a light valve and a lens. The illumination system includes a light source device and a wavelength conversion device. The light source device is adapted to provide an excitation beam. The wavelength conversion device is located on a transmission path of an excitation beam and adapted to convert the excitation beam into an illumination beam. The wavelength conversion device includes a substrate, a heat-conducting connection structure, a first reflective structure and a wavelength conversion structure. The substrate has a first surface, a second surface and an axis center. The first surface is opposite to the second surface. The heat-conducting connection structure is disposed on the first surface of the substrate and around the axis center. The first reflective structure is disposed on the heat-conducting connection structure and around the axis center. The heat-conducting connection structure is located between the first surface of the substrate and the first reflective structure. The wavelength conversion structure is disposed on the first reflective structure and around the axis center. The first reflective structure is located between the wavelength conversion structure and the heat-conducting connection structure. The light valve is located on the transmission path of the illumination beam and adapted to convert the illumination beam into the image beam. The lens is located on the transmission path of the image beam. The image beam becomes a projection beam after passing through the lens.

In order to achieve at least one of the objects or other objects, another embodiment of the invention provides a wavelength conversion device, including a substrate, a heat-conducting connection structure, a first reflective structure and a wavelength conversion structure. The substrate has a first surface, a second surface and an axis center. The first surface is opposite to the second surface. The heat-conducting connection structure is disposed on the first surface of the substrate and around the axis center. The first reflective structure is disposed on the heat-conducting connection structure and around the axis center. The heat-conducting connection structure is located between the first surface of the substrate and the first reflective structure. The wavelength conversion structure is disposed on the first reflective structure and around the axis center. The first reflective structure is located between the wavelength conversion structure and the heat-conducting connection structure.

In an embodiment of the projector of the invention, the wavelength conversion device includes a substrate, a heat-conducting connection structure, a first reflective structure, and a wavelength conversion structure. The first reflective structure is disposed on the substrate by using the heat-conducting connection structure. The wavelength conversion structure is disposed on the first reflective structure. With such a structural design, the thermal energy caused during the excitation process of the wavelength conversion structure caused by the excitation beam may be rapidly transferred to the thermally conductive substrate, so that the temperature of the wavelength conversion structure may not increase rapidly, (i.e. the temperature of the wavelength conversion structure may increase slowly or may not increase), and the problem of brightness decay is alleviated.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to help provide a thorough understanding of the invention, and are incorporated as a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and these drawings are shown by way of illustrating specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
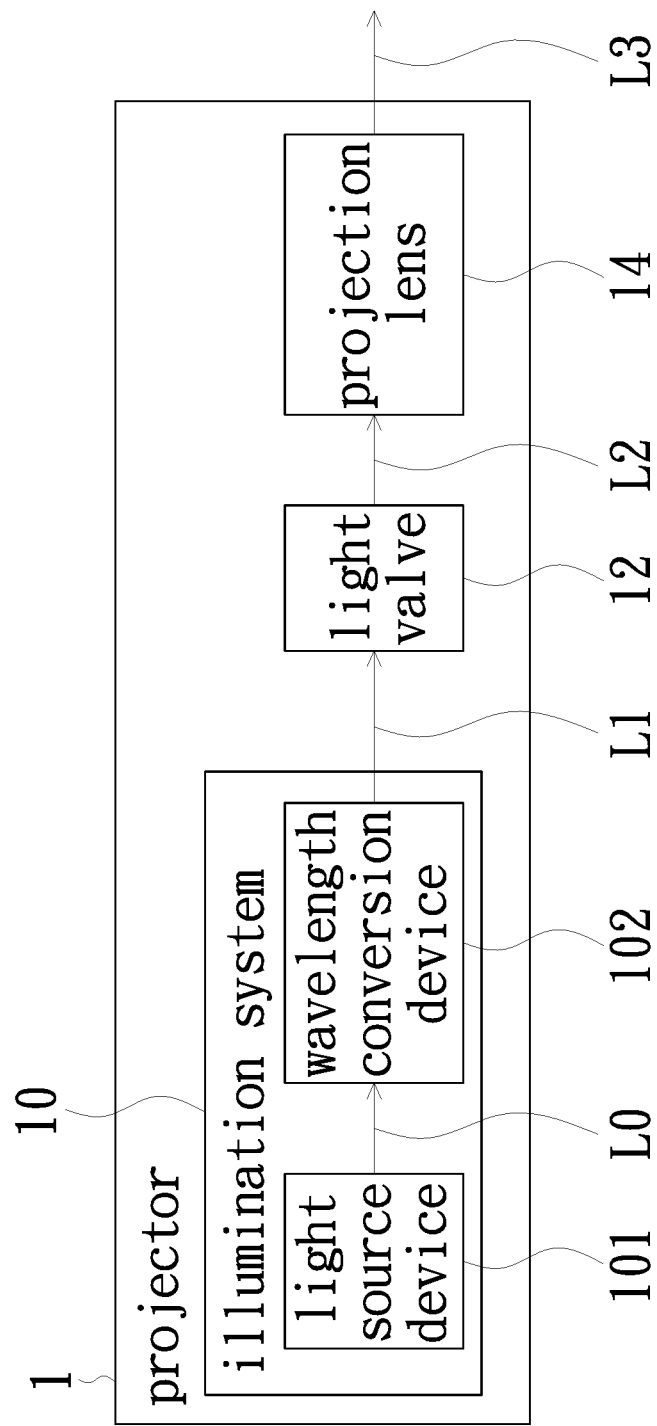
FIG. 1 is a functional block diagram of a projector in accordance with an embodiment of the invention.

FIG. 1 is a functional block diagram of a projector in accordance with an embodiment of the invention. As shown in FIG. 1, the projector 1 of the embodiment includes an illumination system 10, a light valve 12, and a lens 14. In an embodiment, the illumination system 10 includes a light source device 101 and a wavelength conversion device 102. The light source device 101 is configured to provide an excitation beam L0. In an embodiment, the light source device 101 and the excitation beam L0 are, for example, a laser light source and a laser beam respectively, but the invention is not limited thereto. The wavelength conversion device 102 is located on a transmission path of the excitation beam L0 and configured to convert the excitation beam L0 into an illumination beam L1. The light valve 12 is located on the transmission path of the illumination beam L1 and configured to convert the illumination beam L1 into an image beam L2. In the embodiment, the light valve 12 may be a digital micro-mirror device (DMD), a liquid crystal on silicon (LCoS) or a liquid crystal display (LCD) panel, but the invention is not limited thereto. The lens 14 is located on the transmission path of the image beam L2, which becomes a projection beam L3 after passing through the lens 14. The projector 1 of the embodiment may employ a configuration of a monolithic digital micro-mirror device or a configuration of a multi-piece (three-piece for example) liquid crystal on silicon (LCoS). The number of the light valve(s) is not limited to the disclosure the invention.

Figure 2A:
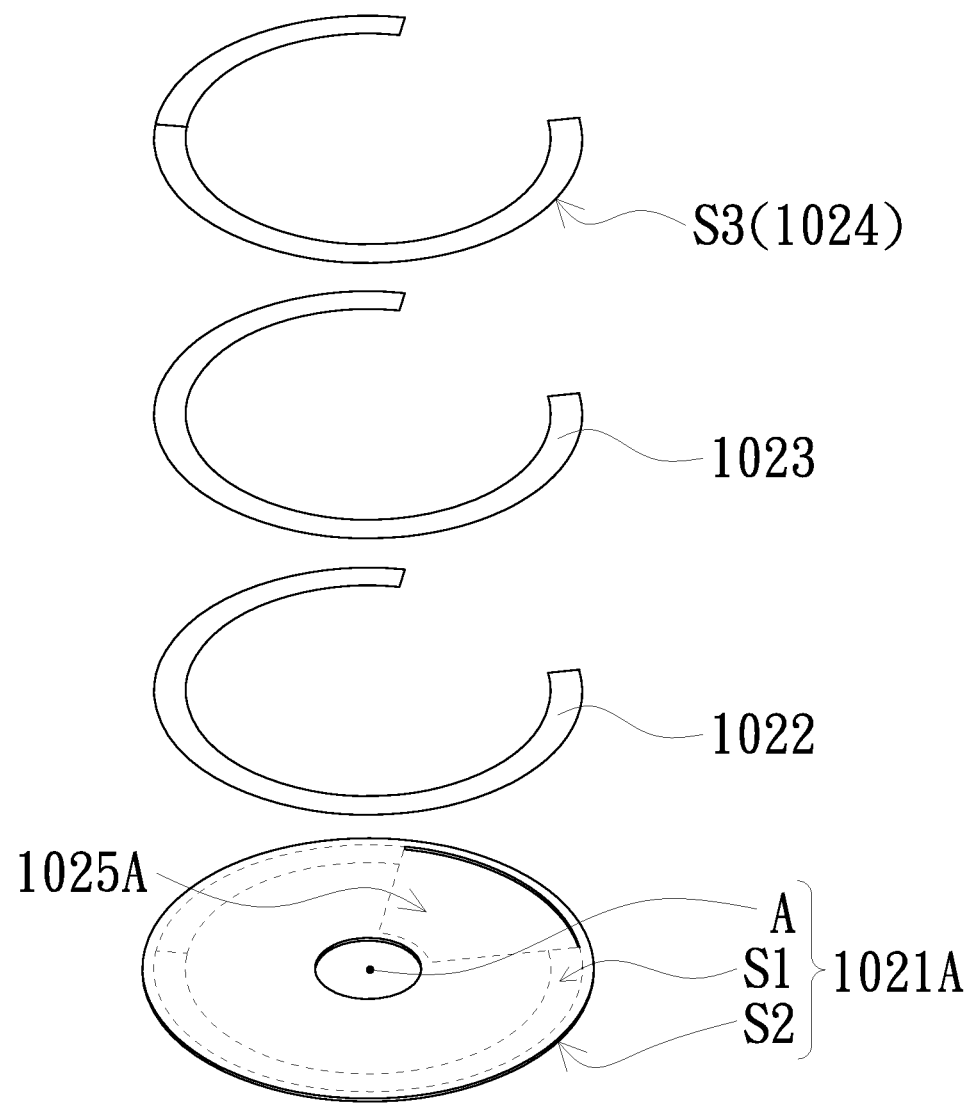
FIG. 2A is a schematically exploded view of elements of a wavelength conversion device in accordance with an embodiment of the invention.

The detailed construction of the wavelength conversion device of the embodiment will be further described below. FIG. 2A is a schematically exploded view of elements of a wavelength conversion device in accordance with an embodiment of the invention. As shown in FIG. 2A, the wavelength conversion device 102A of the embodiment includes a substrate 1021A, a heat-conducting connection structure 1022, a first reflective structure 1023, and a wavelength conversion structure 1024. The substrate 1021A has a first surface S1, a second surface S2, and an axis center A. The first surface S1 is opposite to the second surface S2. In the embodiment, the heat-conducting connection structure 1022 is configured to connect the first surface S1 of the substrate 1021A and around the axis center A of the substrate 1021A. The first reflective structure 1023 is disposed on the heat-conducting connection structure 1022 and around the axis center A of the substrate 1021A. In the embodiment, the heat-conducting connection structure 1022 is located and connected between the first surface S1 of the substrate 1021A and the first reflective structure 1023. The wavelength conversion structure 1024 is disposed on the first reflective structure 1023 and around the axis center A of the substrate 1021A. In the embodiment, the first reflective structure 1023 is located and connected between the wavelength conversion structure 1024 and the heat-conducting connection structure 1022. In the embodiment, an area 1025A of the wavelength conversion device 102A may be a light penetrating area, a light reflection area, or a light conversion area, but the invention is not limited thereto. In an embodiment, with the area 1025A being a light penetrating area a beam may pass through it. In another embodiment, with the area 1025A being a light reflection area, a beam may be reflected. In yet another embodiment, with the area 1025A being a light conversion area, the excitation beam may be converted into an excited beam.

Figure 2B:
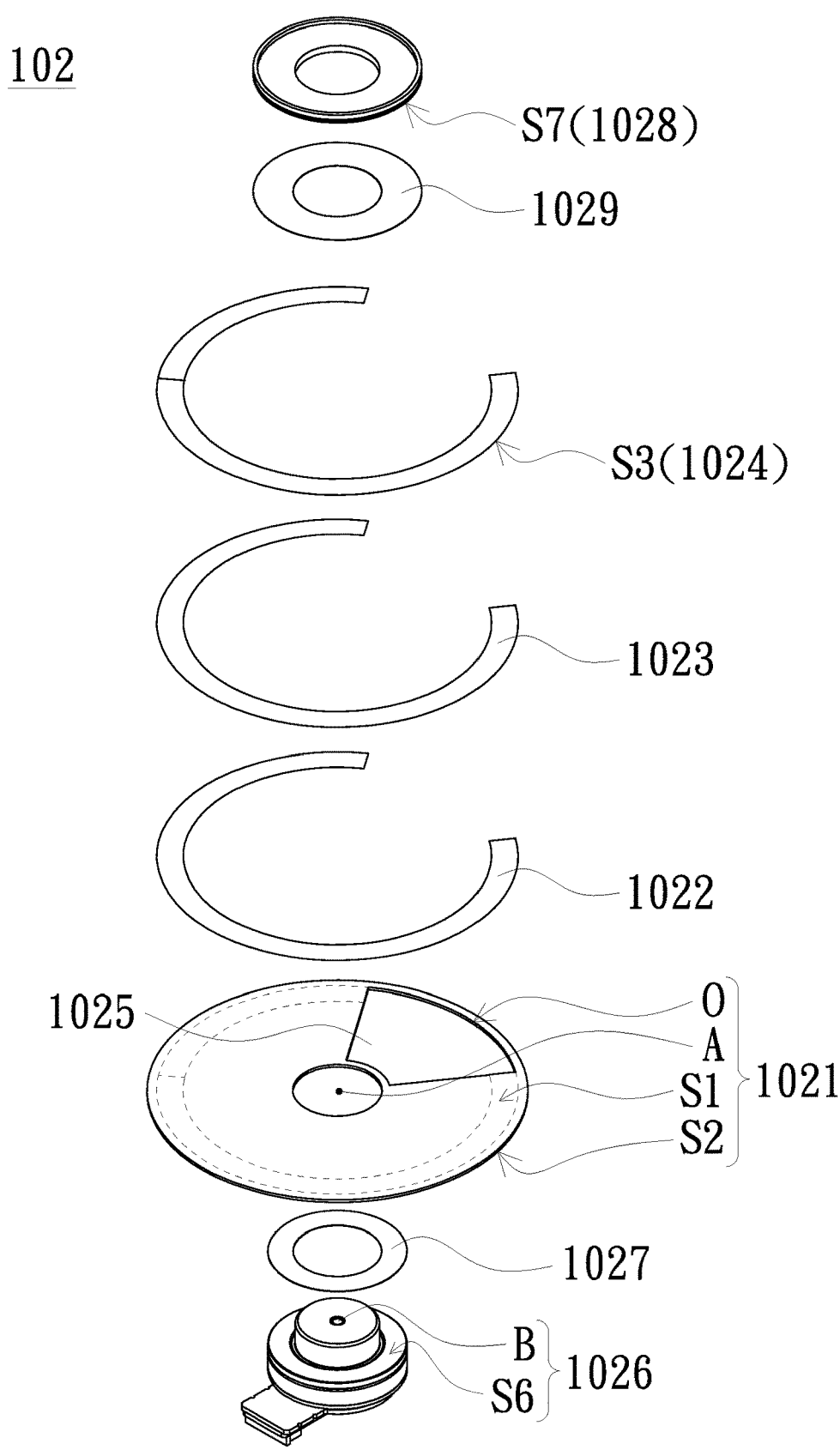
FIG. 2B is a schematically exploded view of elements of the wavelength conversion device shown in FIG. 1.
Figure 3:
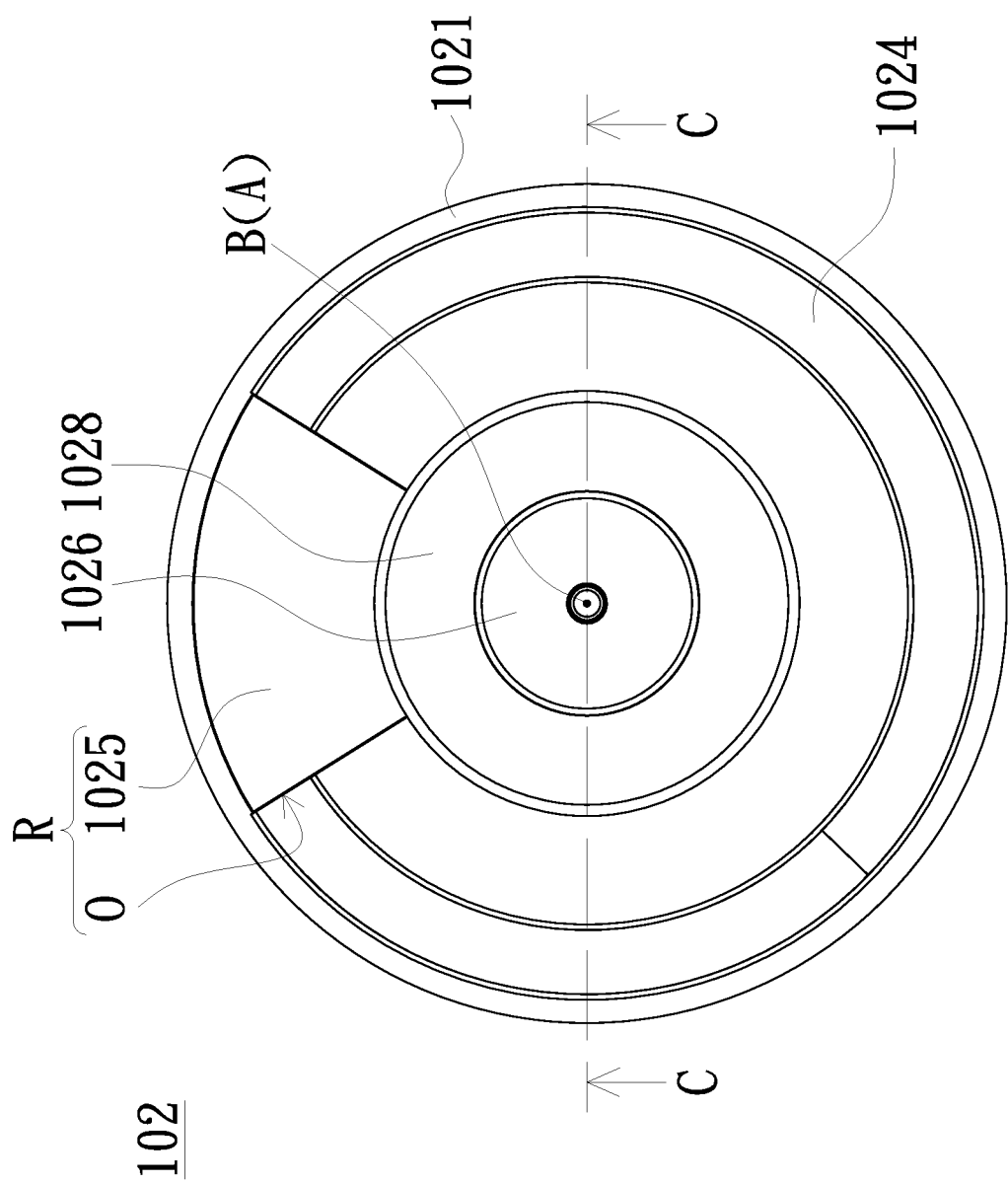
FIG. 3 is a schematic top view of the assembled wavelength conversion device shown in FIG. 1.
Figure 4:
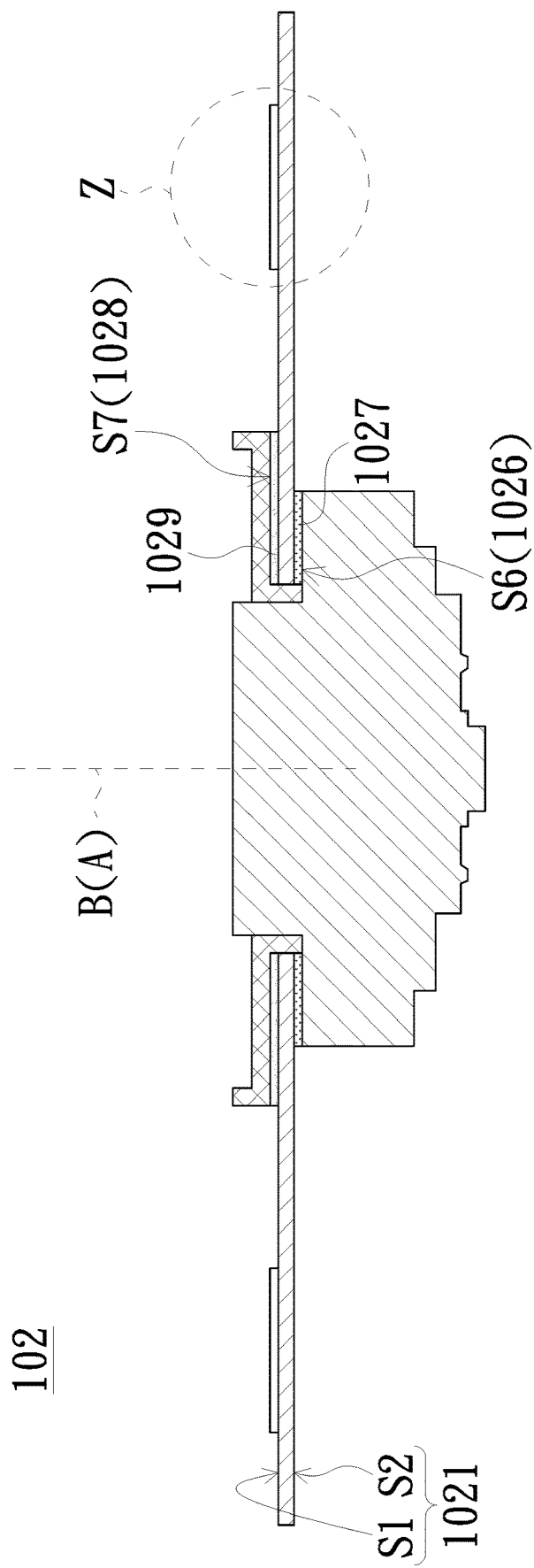
FIG. 4 is a schematic cross-sectional view cut along the line C-C shown in FIG. 3.
Figure 5:
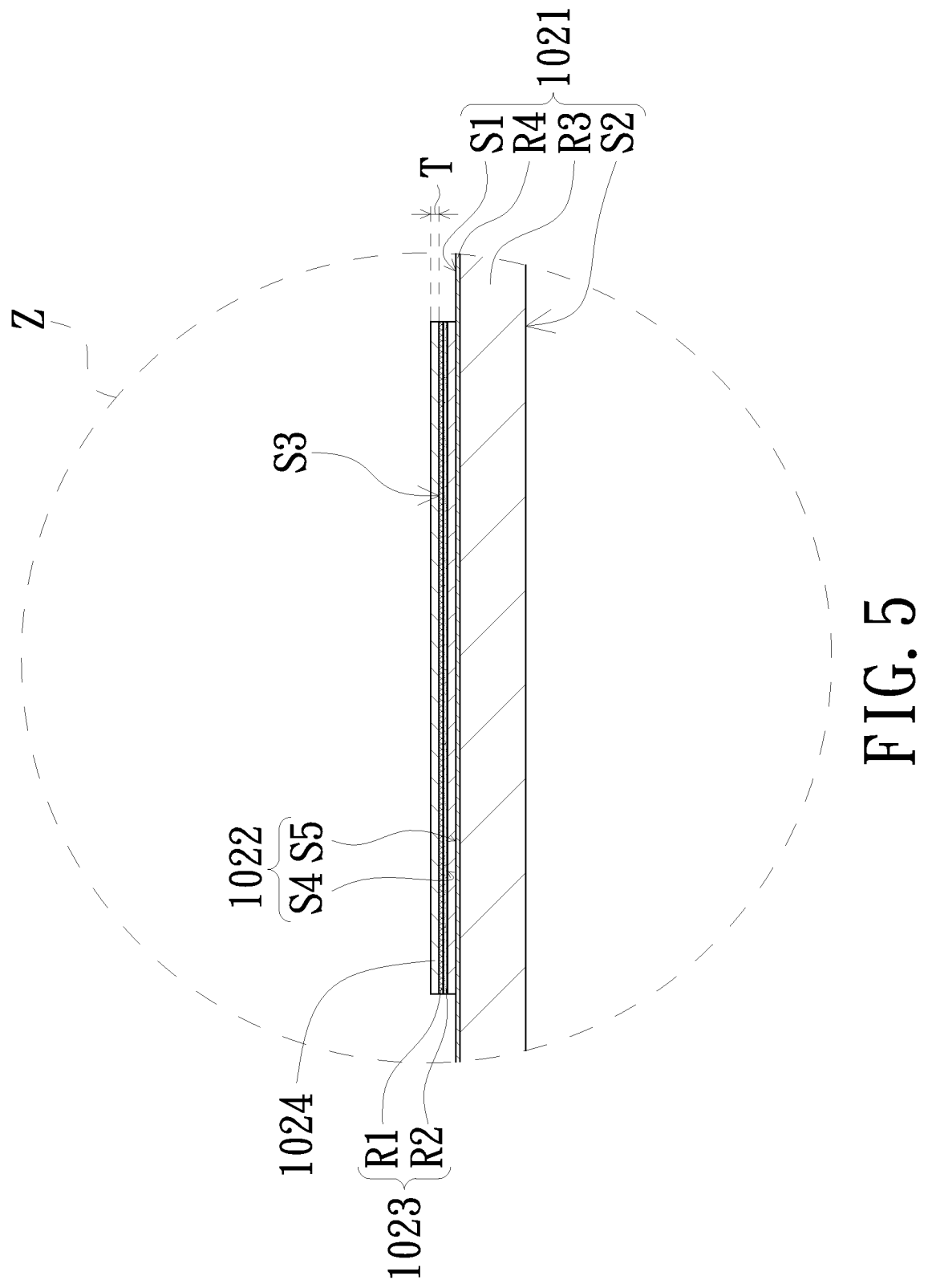
FIG. 5 is a schematic zoom-in view of the area Z shown in FIG. 4.

FIG. 2B is a schematically exploded view of elements of the wavelength conversion device shown in FIG. 1. FIG. 3 is a schematic top view of the assembled wavelength conversion device shown in FIG. 1. FIG. 4 is a schematic cross-sectional view cut along the line C-C shown in FIG. 3. FIG. 5 is a schematic zoom-in view of the area Z shown in FIG. 4. As shown in FIG. 2B to FIG. 5, the wavelength conversion device 102 of the embodiment includes a substrate 1021, a heat-conducting connection structure 1022, a first reflective structure 1023, and a wavelength conversion structure 1024. The substrate 1021 has a first surface S1, a second surface S2, and an axis center A. The heat-conducting connection structure 1022 is disposed on the first surface S1 of the substrate 1021 and around the axis center A of the substrate 1021. The first reflective structure 1023 is disposed on the heat-conducting connection structure 1022 and around the axis center A of the substrate 1021. In the embodiment, the heat-conducting connection structure 1022 is located between the first surface S1 of the substrate 1021 and the first reflective structure 1023. The wavelength conversion structure 1024 is disposed on the first reflective structure 1023 and around the axis center A of the substrate 1021.

As shown in FIG. 2B to FIG. 5, in an embodiment, the wavelength conversion structure 1024 may have an engagement surface S3 facing the first reflective structure 1023. The engagement surface S3 of the wavelength conversion structure 1024 is engaged to the first reflective structure 1023. Furthermore, in an embodiment, the wavelength conversion structure 1024 is a plate. The plate-shaped wavelength conversion structure 1024 includes a plurality of phosphors. The concentration of the phosphors distributed in the wavelength conversion structure 1024 is no less than about 50% and no greater than about 100%. In detail, in the embodiment, the wavelength conversion structure 1024 is a sintering processed plate including a plurality of phosphors. For example, in an embodiment, the wavelength conversion structure 1024 is, for example, a plate formed by sintering phosphor powders and glass powders, where the volume percent concentration of the phosphor is no less than about 50% and no greater than about 100%. In another embodiment, the wavelength conversion structure 1024 is, for example, a plate formed by sintering phosphor powders and ceramic powders, where the volume percent concentration of the phosphor is no less than about 50% and no greater than about 100%. In still another embodiment, the wavelength conversion structure 1024 is, for example, a plate formed substantially all by phosphor powders, where the concentration of the phosphor may be about 100%. In the embodiment, with the wavelength conversion structure 1024 formed substantially all by phosphor powders, the wavelength conversion structure 1024 may be a plate formed from single-crystal phosphor powders or polycrystalline phosphor powders, but the invention is not limited thereto. In addition, in an embodiment, the plate-shaped wavelength conversion structure 1024 may have a thickness T no less than about 0.05 millimeter and no greater than about 0.3 millimeter, but the invention is not limited thereto. In an embodiment, the thickness of the wavelength conversion structure 1024 is no less than about 0.1 millimeter and no greater than about 0.3 millimeter.

As shown in FIG. 5, in an embodiment, the first reflective structure 1023 includes a reflective layer R1 and a metal layer R2, the metal layer R2 of the first reflective structure 1023 is located between the reflective layer R1 and the heat-conducting connection structure 1022, and the metal layer R2 of the first reflective structure 1023 is connected to the surface S4 of the heat-conducting connection structure 1022. In the embodiment, the material of the heat-conducting connection structure 1022 includes, for example, at least one of solder and an eutectic welding material, but the invention is not limited thereto. In the embodiment, the material of the metal layer R2 of the first reflective structure 1023 includes, for example, at least one of copper, nickel, tin, gold, and silver. However, the invention is not limited thereto. In the embodiment, the reflective layer R1 of the first reflective structure 1023 is a high-reflective film, and the material of the reflective layer R1 may include, for example, at least one of a dielectric, aluminum, silver, and a diffuse reflection material, but the invention is not limited thereto. In the embodiment, the metal layer R2 is, for example, plated onto the reflective layer R1 and the reflective layer R1 is, for example, plated on the wavelength conversion structure 1024, but the invention is not limited thereto. Due to the characteristic that the solder/eutectic welding material may be bonded well with any one of copper, nickel, tin, gold, and silver, the first reflective structure 1023 of the embodiment may be firmly connected with the heat-conducting connection structure 1022, a peeling-off may be avoided, and such the wavelength conversion structure 1024, the first reflective structure 1023 and the heat-conducting connection structure 1022 may be firmly connected without peeling-off.

As shown in FIG. 5, in an embodiment, the substrate 1021 includes a base layer R3 and a metal layer R4, the metal layer R4 of the substrate 1021 is located between the base layer R3 and the heat-conducting connection structure 1022, and the metal layer R4 of the substrate 1021 is connected to the surface S5 of the heat-conducting connection structure 1022. In an embodiment, the material of the base layer R3 of the substrate 1021 is, for example, at least one of aluminum and its alloys, aluminum nitride (AlN), copper and its alloys and ceramics, which may have a good thermal coefficient. The ceramics includes, for example, at least one of aluminum nitride, silicon nitride ($Si_3N_4$), silicon carbide (SiC), aluminum-based silicon carbide (Al—SiC), and boron nitride (BN). However, the invention is not limited thereto. In an embodiment, the material of the base layer R3 of the substrate 1021 is, for example, at least one of glass ($SiO_2$) and sapphire, which may have a good penetration coefficient for light, but the invention is not limited thereto. In the embodiment, the material of the metal layer R4 of the substrate 1021 includes, for example, at least one of copper, nickel, tin, gold, and silver, but the invention is not limited thereto. In the substrate 1021 of the embodiment, the metal layer R4 is, for example, plated on the base layer R3, that is, the metal layer R4 made of copper, nickel, tin, gold or silver is plated on the base layer R3 made of aluminum (or aluminum alloy, copper and its alloys, ceramics and so on). However, the invention is not limited thereto. Due to the characteristic that the solder/eutectic welding material (the material of the heat-conducting connection structure 1022) may be bonded well with any one of copper, nickel, tin, gold, and silver, the substrate 1021 of the embodiment can be firmly connected with the heat-conducting connection structure 1022, and a peeling-off may be avoided. It may be appreciated from the above description that, in the embodiment, the wavelength conversion structure 1024, the first reflective structure 1023, the heat-conducting connection structure 1022 and the substrate 1021 may be firmly connected without peeling off. Additionally or alternatively, the thermal coefficient of the heat-conducting connection structure 1022 may be, for example, greater than or equal to that of the substrate 1021.

As shown in FIG. 1, FIG. 2B, and FIG. 3, the wavelength conversion device 102 of an embodiment may further include a transparent component 1025. In an embodiment, the transparent component 1025 is disposed at an opening O of the substrate 1021 and acts as a light penetrating area R adjacent to the heat-conducting connection structure 1022, the first reflective structure 1023, and the wavelength conversion structure 1024. In the embodiment, the light penetrating area R is used to allow the excitation beam L0 to pass through without exciting the wavelength conversion structure 1024, that is, the excitation beam L0 that passes through the light penetrating area R may not be converted by the phosphor of the wavelength conversion structure 1024. In an un-illustrated embodiment, the light penetrating area R may also be formed by an opening O without the transparent component 1025.

As shown in FIG. 2B to FIG. 5, the wavelength conversion device 102 of the embodiment further includes a driving motor 1026 and a connection layer 1027. In an embodiment, the connection layer 1027 is, for example, made from an adhesive. However, the invention is not limited thereto. In the embodiment, the driving motor 1026 is disposed on the second surface S2 of the substrate 1021, the connection layer 1027 is located between the driving motor 1026 and the second surface S2 of the substrate 1021, and the driving motor 1026 is connected to the second surface S2 of the substrate 1021 by using the connection layer 1027. In detail, in the embodiment, the driving motor 1026 has a shaft B and an engagement surface S6. The connection layer 1027 is, for example, a colloid coated on the engagement surface S6 of the driving motor 1026, through which engagement surface S6 of the driving motor 1026 is adhered to the second surface S2 of the substrate 1021. That is, in the embodiment, the coating area of the connection layer 1027 may be approximately equal to the area of the engagement surface S6, so that both the driving motor 1026 and the substrate 1021 can be firmly adhered to each other. However, the invention does not limit the connection means by which the driving motor and the substrate are connected. In addition, in the embodiment, the shaft B of the driving motor 1026 is overlapped with the axis center A of the substrate 1021.

As shown in FIG. 2B to FIG. 5, the wavelength conversion device 102 of the embodiment further includes an annular 1028 and a connection layer 1029. In an embodiment, the connection layer 1029 is, for example, made from an adhesive. In the embodiment, the annular 1028 is disposed on the first surface S1 of the substrate 1021 and covers part of the transparent component 1025. In the embodiment, the annular 1028 is located between the substrate 1021 and the wavelength conversion structure 1024 and around the axis center A of the substrate 1021. That is, in the embodiment, the annular 1028 is located between the driving motor 1026 and the wavelength conversion structure 1024 and around the shaft B of the driving motor 1026. In the embodiment, the connection layer 1029 is located between the annular 1028 and the first surface S1 of the substrate 1021 and is located between the annular 1028 and the transparent component 1025. In the embodiment, the annular 1028 is connected to the first surface S1 of the substrate 1021 and the transparent component 1025 by using the connection layer 1029. In detail, in the embodiment, the annular 1028 has an engagement surface S7 facing the substrate 1021 and the material of the annular 1028 is, for example, a metal. However, the invention is not limited thereto. In the embodiment, the connection layer 1029 is, for example, a colloid coated on the engagement surface S7 of the annular 1028, through which the engagement surface S7 of the annular 1028 is adhered to the first surface S1 of the substrate 1021 and the transparent component 1025. That is, in the embodiment, the coating area of the connection layer 1029 may be approximately equal to the area of the engagement surface S7, so that the annular 1028 can be firmly adhered to the substrate 1021 and the transparent component 1022. However, the invention does not limit the connection means by which the annular and the substrate/the transparent component are connected.

From the above, it is known that, with the structural design of the wavelength conversion device in the embodiment, the thermal energy caused during the excitation process of the wavelength conversion structure 1024 caused by the excitation beam may be rapidly conducted to the substrate 1021A/1021, and the heat is then exported outside the wavelength conversion device by the substrate 1021A/1021 having a good thermal coefficient. In addition, in the embodiment, the first reflective structure 1023 is located between the wavelength conversion structure 1024 and the heat-conducting connection structure 1022, therefore, after the excitation beam is excited into an excited beam by the wavelength conversion structure 1024, the excited beam can be directly reflected by the first reflective structure 1023 and not transmitted to the substrate 1021A/1021. In this way, the conventional structure of the substrate coated by mixing the adhesive and the phosphor (being fluorescent glue) can be replaced, and then the problem of the brightness decay for the phosphor of the fluorescent glue and the problem of being broken or failed for the fluorescent glue due to high temperature can be solved.

Figure 6:
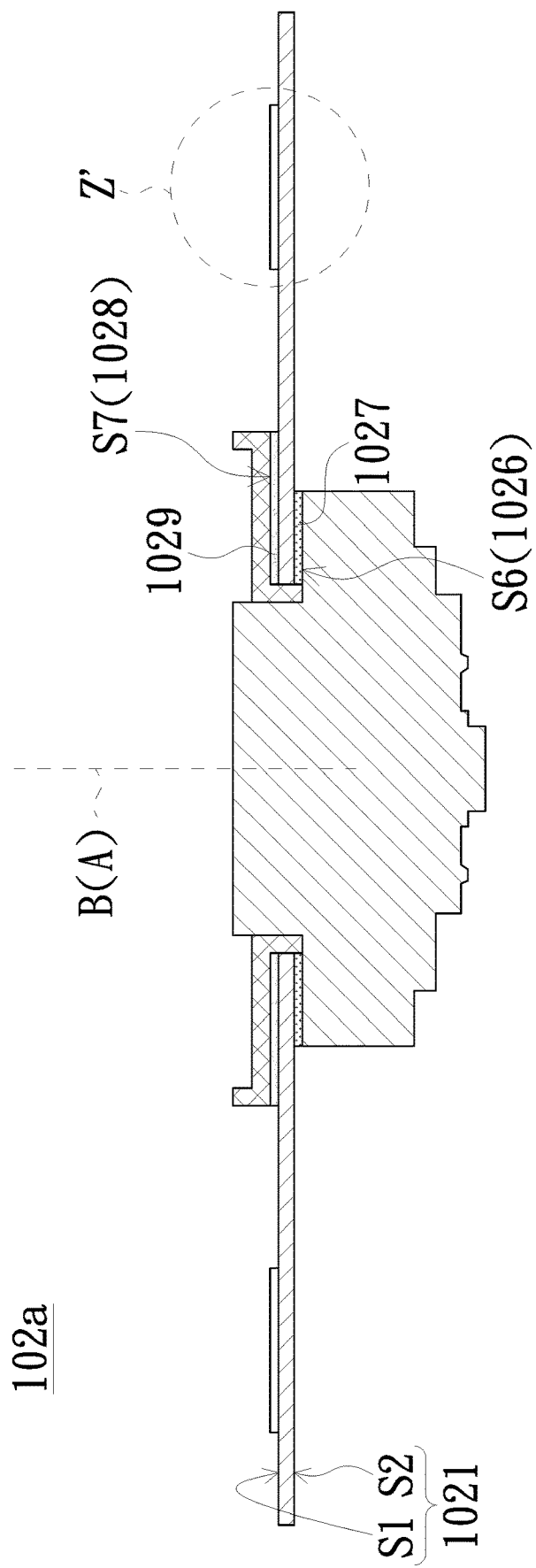
FIG. 6 is a schematic cross-sectional view of a wavelength conversion device in accordance with another embodiment of the invention.
Figure 7:
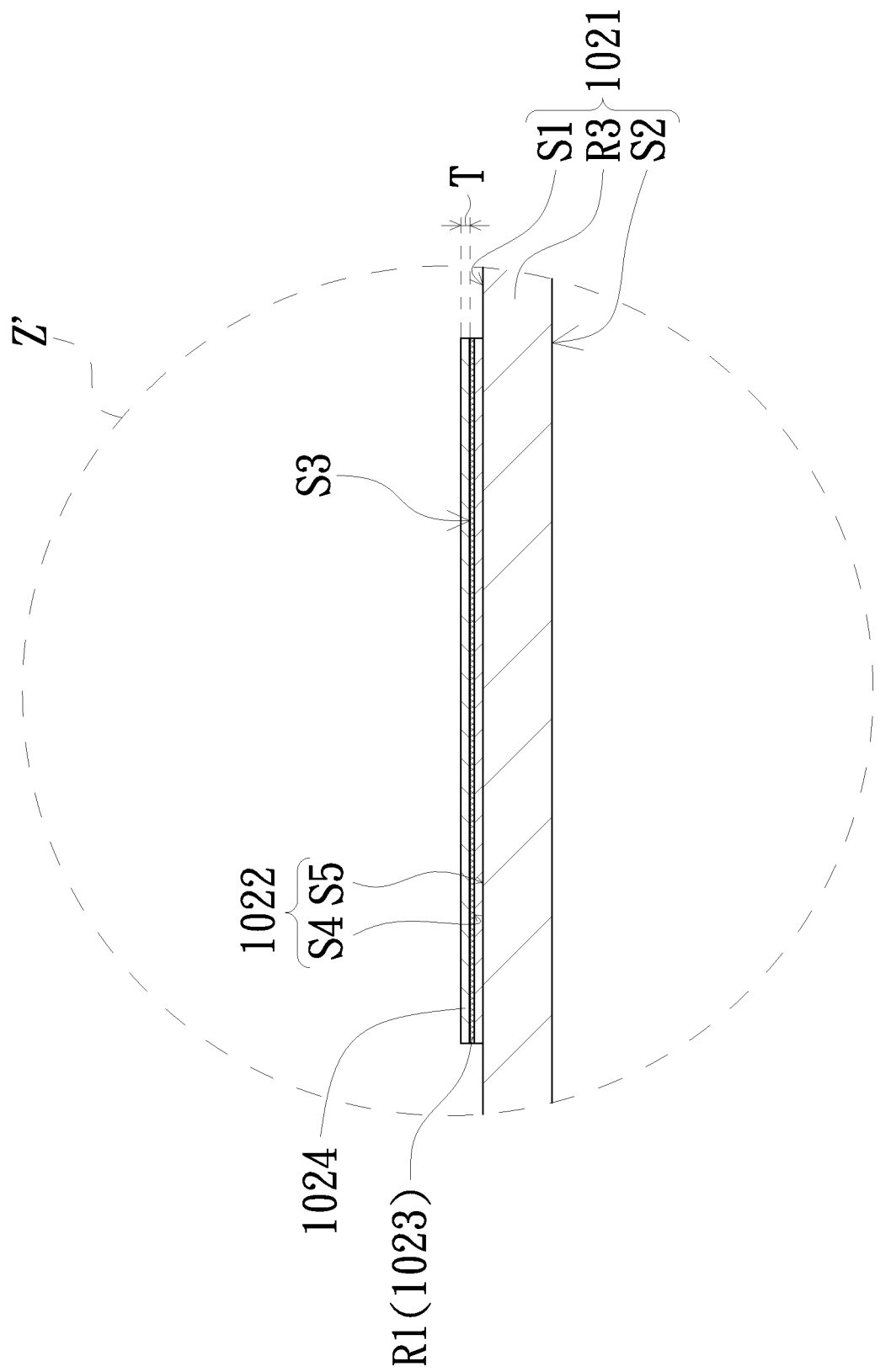
FIG. 7 is a schematic zoom-in view of the area Z' shown in FIG. 6.

The structure of the first reflective structure 1023 having a reflective layer R1 and a metal layer R2 and the substrate 1021 having a base layer R3 and a metal layer R4 is an embodiment of the invention, but the invention is not limited thereto. In an embodiment, the disposition of the metal layer R2 in FIG. 5 in the first reflective structure 1023 may also be omitted, while the disposition of the metal layer R4 in FIG. 5 in the substrate 1021 may also be omitted, as the wavelength conversion device 102a shown in FIG. 6 and FIG. 7. FIG. 6 is a schematic cross-sectional view of a wavelength conversion device in accordance with another embodiment of the invention. FIG. 7 is a schematic zoom-in view of the area Z' shown in FIG. 6. In an embodiment, the reflective layer R1 of the first reflective structure 1023 is, for example, a high-reflective film which can connect with solder/eutectic welding material (being, for example, the material of the heat-conducting connection structure 1022). The base layer R3 of the substrate 1021 is, for example, a carrier board which can connect with solder/eutectic welding material. The high reflective property is realized by, for example, at least one of a dielectric, aluminum, silver, and a diffuse reflection material, while the material which can connect with solder/eutectic welding material includes, for example, at least one of copper, nickel, tin, gold, and silver. The carrier board is, for example, at least one of aluminum and its alloys, aluminum nitride, copper and its alloys, glass, sapphire, and ceramics. The ceramics includes, for example, at least one of aluminum nitride, silicon nitride, silicon carbide, aluminum-based silicon carbide, and boron nitride, but the invention is not limited thereto. In an embodiment, the material, which can connect with solder/eutectic welding material, is mixed in the reflective layer R1 and the base layer R3, thus the reflective layer R1 can have a reflective function, the base layer R3 can have a carrying function, and the reflective layer R1 and the base layer R3 can both have the function of connecting with solder/eutectic welding material (such as the material of the heat-conducting connection structure 1022). However, in other embodiments, the reflective layer R1 of the first reflective structure 1023 may also be a high-reflective film without connecting with solder/eutectic welding material. The base layer R3 of the substrate 1021 may also be a carrier board without connecting with solder/eutectic welding material, wherein, the material of the high-reflective film includes, for example, at least one of a dielectric, aluminum, and a diffuse reflection material. The material of the carrier board includes, for example, at least one of aluminum and its alloys, aluminum nitride, glass, sapphire, and ceramics, while ceramics includes, for example, at least one of aluminum nitride, silicon nitride, silicon carbide, aluminum-based silicon carbide, and boron nitride, but the invention is not limited thereto. In other embodiments, the reflective layer R1 and the base layer R3 both do not, for example, have the material which can connect with solder/eutectic welding material, thus the material of the heat-conducting connection structure 1022 connecting between the reflective layer R1 and the base layer R3 is, for example, at least one of a silver glue and a thermal conductive adhesive. However, the invention is not limited thereto.

In the above embodiment, an eutectic welding material is, for example, a gold tin alloy (Au—Sn Alloy), but the invention is not limited thereto. In an embodiment, a thermal conductivity of solder/eutectic welding material can reach, for example, 50-100 W/mK. In an embodiment, the thermal conductivity of the silver glue can reach, for example, 1-300 W/mK. In another embodiment, the thermal conductivity of the silver glue is, for example, 5-25 W/mK. In an embodiment, the thermal conductivity of the thermal conductive adhesive is, for example, 1-50 W/mK. In this way, the heat-conducting connection structure 1022 in the above embodiment uses solder, an eutectic welding material, a silver glue, or a thermally conductive adhesive and the traditional problem of the brightness decay, being broken, or being failed, which is produced due to the use of fluorescent glue, can be effectively improved/solved. Compared to the wavelength conversion device that traditionally uses a fluorescent glue, the temperature of the wavelength conversion device 102/102A/102a in the above embodiment can be lowered by 10-80° C. The temperature of the wavelength conversion device 102/102A/102a in a better embodiment can be lowered by 10-100° C. Compared to the wavelength conversion device that traditionally uses a fluorescent glue, a temperature resistance of the wavelength conversion device 102/102A/102a in the above embodiment can be raised by 10-80° C. The temperature resistance of the wavelength conversion device 102/102A/102a in a better embodiment may be raised by 10-100° C. Compared to the wavelength conversion device that traditionally uses a fluorescent glue, the brightness of the wavelength conversion device 102/102A/102a in the above embodiment can be raised by about 5-30%. The brightness of the wavelength conversion device 102/102A/102a in a better embodiment may be raised by about 5-50%.

Figure 8:
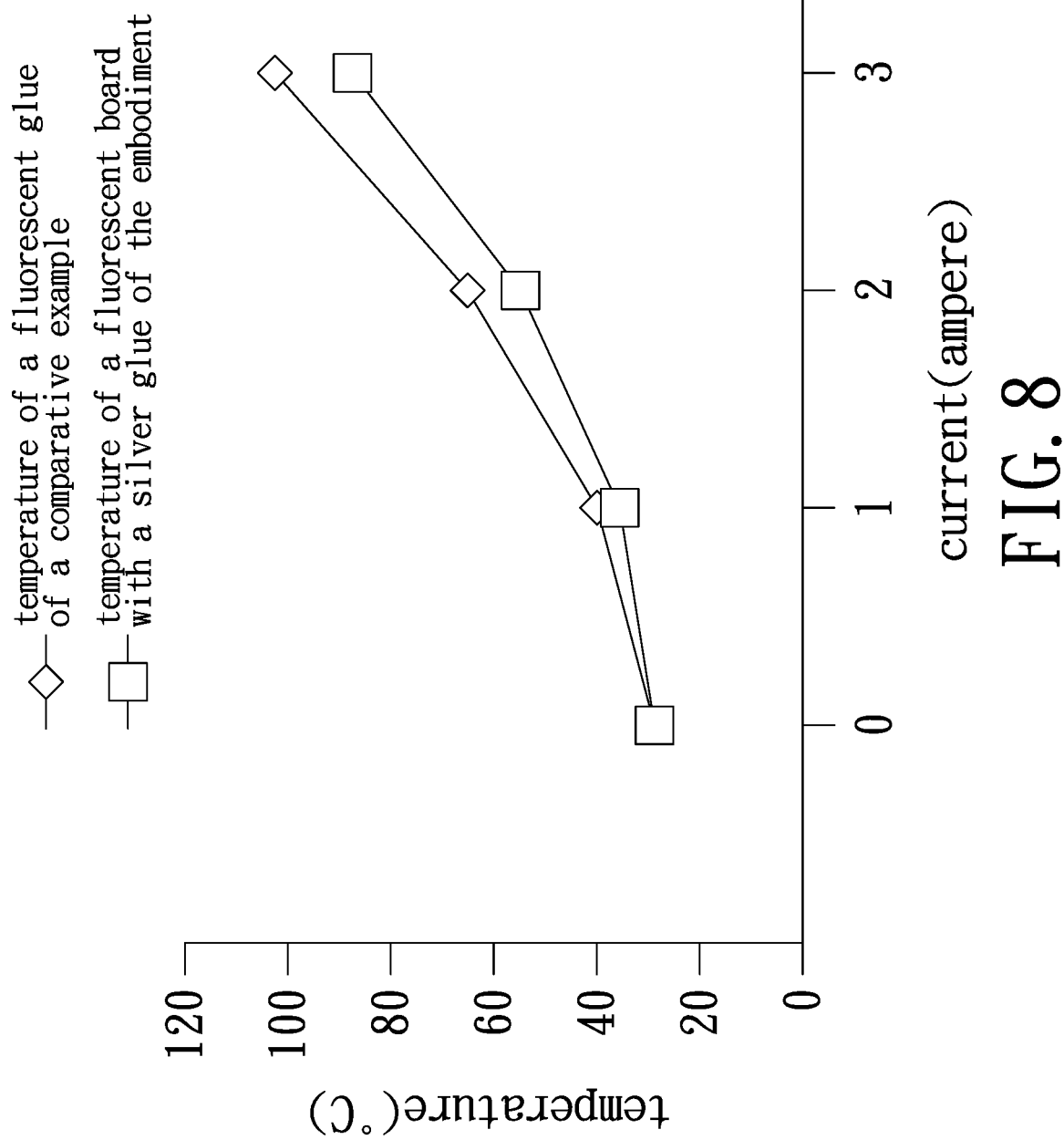
FIG. 8 is a schematic view of the temperature difference between the fluorescent glue according to a comparative example and a fluorescent board with silver glue according to an embodiment of the invention, both of which are excited by a laser beam.

FIG. 8 is a schematic view of the temperature difference between the fluorescent glue according to a comparative example and a fluorescent board with a silver glue according to an embodiment of the invention, both of which are excited by a laser beam. As shown in FIG. 8, and please refer to the data presented in the table below:

| current (ampere) | 0 | 1 | 2 | 3 |
|---|---|---|---|---|
| temperature of a fluorescent glue (° C.) | 25 | 41 | 65 | 102 |
| temperature of a fluorescent board with a silver glue (° C.) | 25 | 37 | 55 | 86 |

It is known from the data in the above table, as a current value of the laser beam gets greater, the temperature of the fluorescent glue of the comparative example and of the fluorescent board with a silver glue in an embodiment raises more. However, when the current value of the laser beam is 3 amperes (A), the surface temperature of the fluorescent glue of the comparative example is as high as 102° C., while the temperature of the fluorescent board with a silver glue in the embodiment is 86° C. This shows that the heat dissipation effect of the fluorescent board with a silver glue in the embodiment is significantly better than the heat dissipation effect of the fluorescent glue of the comparative example.

In summary, the wavelength conversion device of the projector in an e embodiment includes a substrate, a heat-conducting connection structure, a first reflective structure, and a wavelength conversion structure. The first reflective structure is disposed on the substrate by the heat-conducting connection structure. The wavelength conversion structure is disposed on the first reflective structure. Under such a structural design, the thermal energy, produced when the wavelength conversion structure is excited by the excitation beam, can be rapidly conducted to the substrate having a good thermal coefficient, so that the temperature of the wavelength conversion structure may not increase rapidly, (i.e. the temperature of the wavelength conversion structure may increase slowly or may not increase), thus alleviating the problem of the brightness decay.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in an embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
   an illumination system, comprising:
     a light source device, configured to provide an excitation beam; and
     a wavelength conversion device, located on a transmission path of the excitation beam and configured to convert the excitation beam into an illumination beam, wherein the wavelength conversion device comprises:
       a substrate, having a first surface, a second surface, and an axis center, wherein the first surface is opposite to the second surface;
       a heat-conducting connection structure, disposed on the first surface of the substrate and around the axis center;
       a first reflective structure, disposed on the heat-conducting connection structure and around the axis center, wherein the heat-conducting connection structure is located between the first surface of the substrate and the first reflective structure; and
       a wavelength conversion structure, disposed on the first reflective structure and around the axis center, wherein the first reflective structure is located between the wavelength conversion structure and the heat-conducting connection structure;
   a light valve, located on a transmission path of the illumination beam and configured to convert the illumination beam into an image beam; and
   a lens, located on a transmission path of the image beam, wherein the image beam becomes a projection beam after passing through the lens,
   wherein the first reflective structure comprises a reflective layer and a metal layer plated onto the reflective layer, the metal layer of the first reflective structure is located between the reflective layer and the heat-conducting connection structure, wherein a material of the metal layer of the first reflective structure comprises at least one of copper, nickel, tin, gold, and silver, and a material of the heat-conducting connection structure comprises at least one of solder and an eutectic welding material, the substrate comprises a base layer and a connecting metal layer plated on the base layer, the connecting metal layer is located between the base layer and the heat-conducting connection structure, wherein a material of the connecting metal layer of the substrate comprises at least one of copper, nickel, tin, gold, and silver.

2. The projector according to claim 1, wherein the wavelength conversion structure has an engagement surface facing the first reflective structure, and the engagement surface of the wavelength conversion structure is engaged to the first reflective structure.

3. The projector according to claim 1, wherein a material of the reflective layer of the first reflective structure further comprises at least one of a dielectric, aluminum and a diffuse reflection material.

4. The projector according to claim 1, wherein a material of the base layer of the substrate comprises at least one of aluminum and its alloys, aluminum nitride, copper and its alloys, ceramics, glass and sapphire.

5. The projector according to claim 1, wherein the wavelength conversion structure is a plate, the wavelength conversion structure comprises a plurality of phosphors, and a volume percent concentration of the plurality of phosphors is no less than 50% and no greater than 100%.

6. The projector according to claim 1, wherein a thickness of the wavelength conversion structure is no less than 0.05 millimeter and no greater than 0.3 millimeter.

7. The projector according to claim 1, wherein the wavelength conversion device further comprises a driving motor and a connection layer, the driving motor is disposed on the second surface of the substrate, the connection layer is located between the driving motor and the second surface of the substrate, and the driving motor is connected to the second surface of the substrate by using the connection layer.

8. The projector according to claim 1, wherein the wavelength conversion device further comprises an annular and a connection layer, the annular is disposed on the first surface of the substrate, the annular is located between the substrate and the wavelength conversion structure and around the axis center of the substrate, the connection layer is located between the annular and the first surface of the substrate, and the annular is connected to the first surface of the substrate by using the connection layer.

9. The projector according to claim 1, wherein the wavelength conversion device further comprises a transparent component, the substrate has an opening, and the transparent component is disposed at the opening to constitute a light penetrating area adjacent to the wavelength conversion structure.

10. A wavelength conversion device, comprising:
    a substrate, having a first surface, a second surface and an axis center, wherein the first surface is opposite to the second surface;
    a heat-conducting connection structure, disposed on the first surface of the substrate and around the axis center;
    a first reflective structure, disposed on the heat-conducting connection structure and around the axis center, wherein the heat-conducting connection structure is located between the first surface of the substrate and the first reflective structure; and
    a wavelength conversion structure, disposed on the first reflective structure and around the axis center, wherein the first reflective structure is located between the wavelength conversion structure and the heat-conducting connection structure,
    wherein the first reflective structure comprises a reflective layer and a metal layer plated onto the reflective layer, the metal layer of the first reflective structure is located between the reflective layer and the heat-conducting connection structure, wherein a material of the metal layer of the first reflective structure comprises at least one of copper, nickel, tin, gold, and silver, and a material of the heat-conducting connection structure comprises at least one of solder and an eutectic welding material, the substrate comprises a base layer and a connecting metal layer plated on the base layer, the connecting metal layer is located between the base layer and the heat-conducting connection structure, wherein a material of the connecting metal layer of the substrate comprises at least one of copper, nickel, tin, gold, and silver.

11. The wavelength conversion device according to claim 10, wherein the wavelength conversion structure has an engagement surface facing the first reflective structure, and wherein the engagement surface of the wavelength conversion structure is engaged to the first reflective structure.

12. The wavelength conversion device according to claim 10, wherein a material of the reflective layer of the first reflective structure further comprises at least one of a dielectric, aluminum and a diffuse reflection material.

13. The wavelength conversion device according to claim 10, wherein a material of the base layer of the substrate comprises at least one of aluminum and its alloys, aluminum nitride, copper and its alloys, ceramics, glass and sapphire.

14. The wavelength conversion device according to claim 10, wherein the wavelength conversion structure is a plate, the wavelength conversion structure comprises a plurality of phosphors, and the volume percent concentration of the plurality of phosphors is no less than 50% and no greater than 100%.

15. The wavelength conversion device according to claim 10, wherein a thickness of the wavelength conversion structure is no less than 0.05 millimeter and no greater than 0.3 millimeter.

16. The wavelength conversion device according to claim 10, further comprising a driving motor and a connection layer, wherein the driving motor is disposed on the second surface of the substrate, the connection layer is located between the driving motor and the second surface of the substrate, and the driving motor is connected to the second surface of the substrate by using the connection layer.

17. The wavelength conversion device according to claim 10, further comprising an annular and a connection layer, wherein the annular is disposed on the first surface of the substrate, the annular is located between the substrate and the wavelength conversion structure and around the axis center of the substrate, the connection layer is located between the annular and the first surface of the substrate, and the annular is connected to the first surface of the substrate by using the connection layer.

18. The wavelength conversion device according to claim 10, further comprising a transparent component, wherein the substrate has an opening, the transparent component is disposed at the opening to constitute a light penetrating area adjacent to the wavelength conversion structure.

* * * * *